Patented May 13, 1930

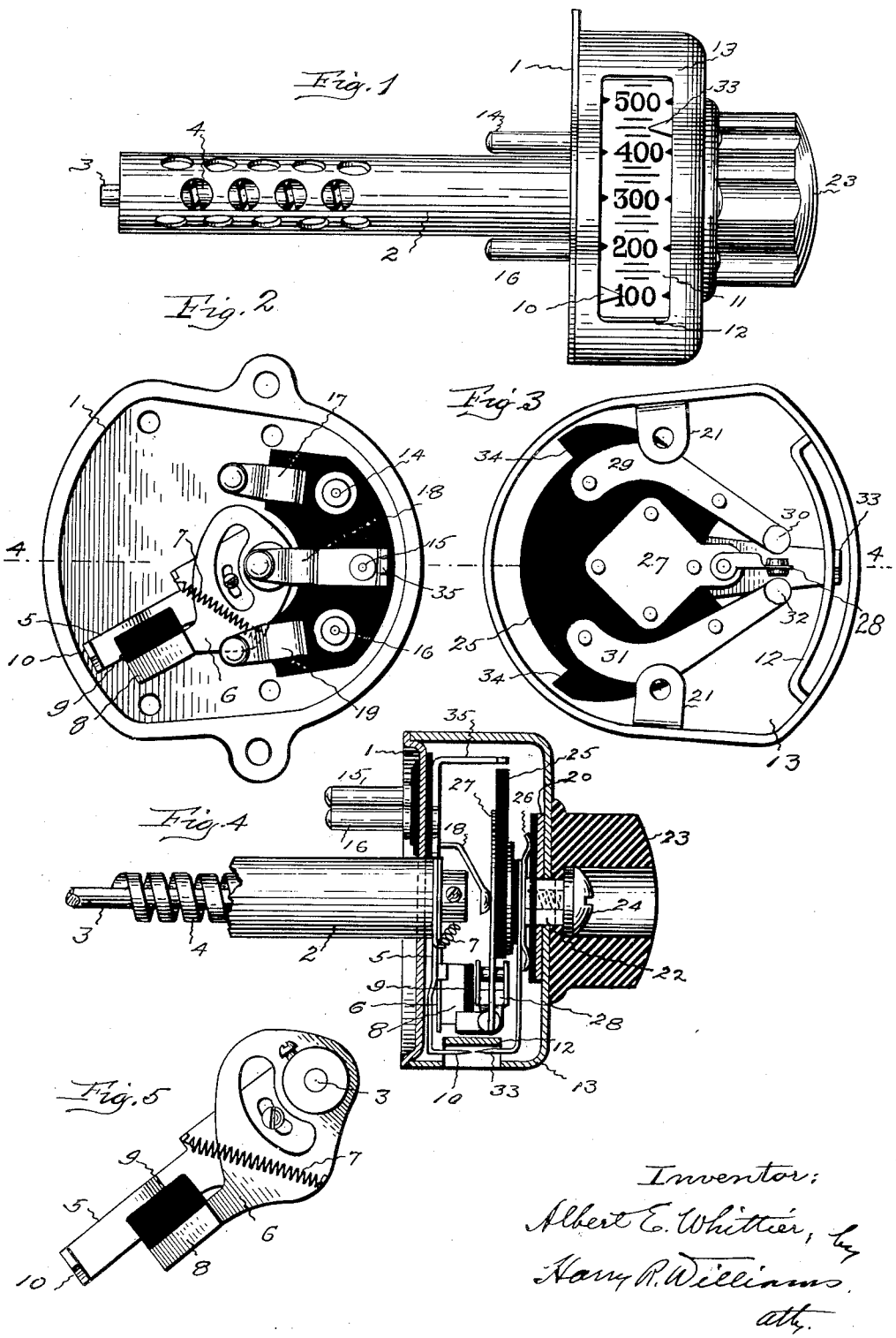

1,757,986

UNITED STATES PATENT OFFICE

ALBERT E. WHITTIER, OF BRISTOL, CONNECTICUT

THERMOSTATIC CONTROL FOR ELECTRICALLY-HEATED APPARATUS

Application filed November 28, 1928. Serial No. 322,374.

This invention relates to indicating thermostatic devices which are provided for controlling the current in the circuits of electrically heated apparatus, and more particularly to those controls that are designed to be fastened to the side walls of electrically heated ranges and ovens, of the type illustrated and described in my patent dated May 21, 1929, No. 1,713,578.

In the interior of these controls there are circuit switching means that are set by turning a knob on the exterior, which means have pointers that are visible on the exterior and indicate on a scale the degree of temperature which will be maintained by the particular setting of the switching means. They also have thermostatic or heat responsive elements which carry means that are adapted to engage the switching means and cause the heating circuit to be opened when the maximum degree of heat is reached, and which allow the heating circuit to be closed when the temperature drops below this maximum degree, the thermostatically actuated means having a pointer which indicates on the scale the surrounding temperature at the moment.

It is necessary to the successful operation of these devices that the thermostatic element be accurately adjusted and that it maintain that adjustment at all times in order to ensure the maintenance of the desired temperature at the various degrees to which the switching means may be set. In the prior structures if the circuit switching means were set for a high degree of heat and the temperature in the appliance being controlled was high, and it was desired to have a lower temperature, when the knob was turned to adjust the switching means and the setting pointer downward, the engagement of the switching means with the actuating means carried by the thermostatic element, put an undue strain on the thermostatic element and tended to distort it or disturb its adjustment and thus vary its effective effort. The object of the present invention is to eliminate this disadvantage incident to the prior construction, and this is accomplished by so constructing the switch actuating means that is carried by the thermostatic element and is engaged with the switching means for opening the heating circuit, that it will yield when engaged by the downward turning of the switching means, and thus the strain on the thermostatic element will be relieved, thereby ensuring a more constant effect of the thermostatic element and closer maintenance of the temperatures to the desired degrees.

In the accompanying drawings Fig. 1 shows a side view of a thermostatic heater control which embodies this invention. Fig. 2 is a view looking toward the base of the device with the cover removed. Fig. 3 is a view looking into the cover. Fig. 4 is a section on the plane indicated by the dotted line 4—4 on Figs. 2 and 3. Fig. 5 is a detail view showing the yielding means which is carried by the thermostatic element and which is designed to engage the circuit switching means and open the heating circuit when the desired maximum heat is reached, and allow the switch to close the heating circuit when the temperature drops below the maximum.

The device illustrated has a base plate 1 adapted to be fastened to the outside of the side wall of a range, oven or other appliance to which the device is to be applied. Extending from the back of the base plate is a tubular stem 2 that is designed to project through the wall into the interior of the chamber, the heat of which is to be controlled. Rotarily supported by the base plate and extending through the stem is a spindle 3 and encircling the inner end of the spindle, with an end fastened thereto and an end fastened to the stem, is a coiled strip 4 of thermostatic metal. An arm 5 is fastened to the outer end of the spindle so as to extend radially in front of the base plate. Loosely pivoted on the spindle above this arm is a finger 6. This finger is connected with the arm by a spring 7. At the outer end of this finger is an upwardly extending wall 8 which carries an insulating piece 9. The outer end of the arm is bent up to form a pointer 10 that is adapted to travel in front of the arc-shaped graduated temperature indicating scale 11 which is marked on a depression 12 pressed in from the rim of the cover 13. This pointer is caused to travel over the scale by the oscillations of the arm as the spindle is rotated by the action of the thermostatic coil due to variations of the heat to which it is subjected in the appliance to which the device is applied, and normally the finger is carried by and travels with the arm and pointer.

Fastened to the base plate but insulated therefrom are terminal pins 14, 15 and 16 that extend from the back of the plate and are adapted to receive a terminal plug. On the inside of the back plate and electrically connected with these pins are contact fingers 17, 18 and 19, which extend up into the cover.

Fastened in the cover is a bridge strip 20 with tapped ends 21 for the screws which pass through the back plate and secure the cover in place. Rotatable in an opening through the cover is a hub 22. A knob 23 is fastened by a screw 24 to the outer end of this hub. An insulating piece 25 is fixed on the inner end of this hub so as to turn therewith when the knob is turned. A spring friction washer 26 is arranged on the hub to prevent the parts from accidental turning. Fastened to the middle of this insulating piece is a conducting plate 27 that has an extension at one end to which the switch blade 28 is loosely pivoted. Fastened to the insulating piece near one edge is a conducting plate 29 that has a contact 30 adjacent to one side of the switch blade, and fastened near the other edge of the insulating piece is a conducting plate 31 that has a contact 32 adjacent to the other side of the switch blade. The switch blade is free to oscillate into and out of engagement with the two contacts at the ends of the outer plates. On the hub and turning with it and having its end extended over the outer face of the segmental scale is an indicating pointer 33. When the cover is applied to the base plate the middle conductor plate 27 is engaged by the spring finger 18, the outer conductor plate 29 is engaged by the spring finger 17, and the outer conductor plate 31 is engaged by the spring finger 19, which fingers are electrically connected respectively with the terminal pins 15, 14 and 16 on the back of the base plate.

With the device in position of use the knob is turned until the pointer 33 indicates the degree of heat marked on the dial plate which it is desired to maintain. To whatever point this adjustment is made the conductor plates 27, 29 and 31 are always engaged by the spring fingers 18, 17 and 19. When the main switch of the circuit is closed and the current heats the range, oven or other appliance, as the temperature rises its action on the thermostatic element turns the arm 5 and finger 6 yieldingly connected therewith, upward until the insulating piece 9 which the finger carries, engages the switch blade 28 and lifts it from engagement with the lower contact 32, with which it is normally held in contact by gravity, into engagement with the upper contact 30, and this, through the means usually employed and well known, causes the current of the heating circuit to be cut off. As the temperature drops, owing to the interruption of the current, the thermostatic element turns the arm 5 and finger 6 downward and allows the switch blade to drop back into engagement with the lower contact and again cause the heating current to be turned on. As the thermostatic finger is only required to lift the light switch blade, the device is very efficient and the temperature is maintained very closely to the desired degree. The temperature rises to the degree indicated by the pointer 33 wherever that pointer is set, and remains at practically that degree as long as the heating current is on, and the degree of heat at any moment is indicated by the pointer 10 at the end of the arm that is actuated by the thermostatic element.

The device is readily applied to the side wall of electrically heated apparatus so that the temperature conditions at all times may be clearly observed, and the circuit contacts are made so as to be positive and without danger of disruption. The rear edge of the insulating piece 25 has stop shoulders 34 located to engage the arm 35 projecting from the base plate and prevent the knob from being turned so far as to disconnect the contacts or to cause a short circuit engagement of any of the parts.

If the temperature to which the thermostatic element is subjected is higher than is desired, and the knob is turned so as to move the setting pointer 33 below the indicating pointer 10, as the switch blade 28 moves down with the setting pointer it engages the insulating piece 9 and moves the yielding finger 6 independently of the arm 5, and thus the thermostatic element is relieved of all strain except that incident to the light spring 7, which strain is not sufficient to effect the adjustment of the thermostatic element.

The invention claimed is:

1. A thermostatic control for electric circuits comprising a base and a cover detachably applied thereto, a spindle rotatably supported by the base, thermostatic means controlling the rotary movements of the spindle, an arm rotatable with the spindle, a finger yieldingly connected with said arm, an insulation member rotatably supported by the cover, three conductors mounted on and rotatable with said insulation member, three spring fingers mounted on the base and adapted to engage said conductors, and a switch blade pivotally connected with the intermediate of said conductors and extending between the other conductors and into the path of the finger that is yieldingly connected with the thermostatically controlled arm, whereby the switch blade may be adjusted to the desired degree and said finger will normally as the temperature rises engage said blade and move it from engagement with one conductor into engagement with the other conductor, but when the blade is turned below the finger, the finger will yield without turning the arm to which it is connected.

2. A thermostatic control for electric circuits comprising a base and a cover detachably applied thereto, a spindle rotatably supported by the base, thermostatic means controlling the rotary movement of the spindle, an arm rotatable with the spindle, a finger yieldingly connected with said arm, a pointer movable with the arm, an insulation member rotatably supported by the cover, a pointer movable with said insulation member, three conductors mounted on and rotatable with said insulation member, three spring fingers mounted on the base and adapted to engage said conductors, and a switch blade pivotally connected with the intermediate of said conductors and extending between the other conductors and into the path of the finger that is yieldingly connected with the thermostatically controlled arm, whereby the switch blade may be adjusted to the desired degree and said finger will normally as the temperature rises engage said blade and move it from engagement with one conductor into engagement with the other conductor, but when the blade is turned below the finger the finger will yield without turning the arm to which it is connected.

3. A thermostatic control for electric circuits comprising a base and a cover detachably applied thereto, said cover having a scale applied thereto, a spindle rotatably supported by the base, thermostatic means controlling the rotary movements of the spindle, an arm rotatable with the spindle, a finger yieldingly connected with said arm, a pointer movable with the arm over said scale, an insulation member rotatably supported by the cover, a pointer movable with said insulating member over said scale, three conductors mounted on and rotatable with said insulation member, three spring fingers mounted on the base and adapted to engage said conductors, and a switch blade pivotally connected with the intermediate of said conductors and extending between the other conductors and into the path of the finger that is yieldingly connected with the thermostatically controlled arm, whereby the switch blade may be adjusted to the desired degree and said finger will normally as the temperature rises engage said blade and move it from engagement with one conductor into engagement with the other conductor, but when the blade is turned below the finger the finger will yield without turning the arm to which it is connected.

4. A thermostatic control for electric circuits comprising a base and a cover detachably applied thereto, a spindle rotatably supported by the base, thermostatic means controlling the rotary movements of the spindle, an arm rotatable with the spindle, a finger pivoted on the spindle, a spring connecting the finger with said arm, an insulation member rotatably supported by the cover, three conductors mounted on and rotatable with said insulation member, three spring fingers mounted on the base and adapted to engage said conductors, and a switch blade pivotally connected with the intermediate of said conductors and extending between the other conductors and into the path of the finger that is yieldingly connected with the thermostatically controlled arm, whereby the switch blade may be adjusted to the desired degree and said finger will normally as the temperature rises engage said blade and move it from engagement with one conductor into engagement with the other conductor, but when the blade is turned below the finger the finger will yield without turning the arm to which it is connected.

5. A thermostatic control for electric circuits comprising a base and a cover detachably applied thereto, a spindle rotatably supported by the base, thermostatic means controlling the rotary movements of the spindle, an arm rotatable with the spindle, a finger yieldingly connected with said arm, conductors rotatably mounted in the cover, spring fingers mounted on the base and engaging said conductors, and a switch blade pivotally connected with one of said conductors and adapted to engage the other conductors, said blade having a part that extends into the path of the finger that is yieldingly connected with the thermostatically controlled arm.

6. A thermostatic control for electric circuits comprising a base and a cover detachably applied thereto, a spindle rotatably supported by the base, thermostatic means controlling the rotary movements of the spindle, an arm rotatable with the spindle, a finger yieldingly connected with said arm, conductors rotatably mounted in the cover, spring fingers mounted on the base and engaging said conductors, terminal pins attached to the base and connected with the spring fingers, and a switch blade pivotally connected with one of said conductors and adapted to engage the other conductors, said blade having a part that extends into the path of the finger that is yieldingly connected with the thermostatic controlled arm.

7. A thermostatic control for electric circuits comprising a base and a cover detachably applied thereto, a spindle rotatably supported by the base, thermostatic means controlling the rotary movements of the spindle, an arm rotatable with the spindle, a finger yieldingly connected with said arm, conductors rotatably mounted in the cover, contacts mounted on the base and adapted to engage said conductors, and a pivotally mounted switch blade adapted to engage said conductors, said blade having a part extending into the path of the finger that is yieldingly connected with the thermostatic controlled arm.

8. A thermostatic control for electric circuits comprising a base and a cover detachably applied thereto, a spindle rotatably supported by the base, thermostatic means controlling the rotary movements of the spindle, means rotatable with the spindle, means yieldingly connected with said rotatable means, conductors rotatably mounted in the cover, contacts mounted on the base and adapted to engage said conductors, and a pivotally mounted switch blade adapted to engage said conductors, said blade having a part extending into the path of the means that is yieldingly connected with the said means that is rotatable with the thermostatic controlled spindle.

9. A thermostatic control for electric circuits, comprising adjustable switching means, indicating means adjustable therewith, means for coincidently adjusting said switching means and indicating means, thermostatic means, actuating means adapted to engage said switching means, and a connection between said thermostatic means and actuating means permitting said actuating means to be moved by said switching means without straining said thermostatic means.

10. A thermostatic control for electric circuits, comprising adjustable switching means, indicating means adjustable therewith, means for coincidently adjusting said switching means and indicating means, thermostatic means, and actuating means controlled by the thermostatic means and caused to engage the switching means when moved in one direction by said thermostatic means, said actuating means being substantially free to move independently of said thermostatic means when moved in the opposite direction.

11. A thermostatic control for electric circuits comprising adjustable switching means having a pivoted switch blade and a pair of contacts between which said blade is adapted to move, an indicating pointer adjustable with said switching means, means for rotatably adjusting said switching means and indicating means, thermostatic means, a finger actuated by said thermostatic means, said finger being positioned to move said switch blade from engagement with one contact into engagement with the other contact when said thermostatic means moves said finger to a predetermined position and resilient means between said finger and thermostatic means for permitting the finger to yield without putting undue strain on said thermostatic means when the blade of said switching means is turned backwardly of said position.

12. A thermostatic control for electric circuits, comprising rotatably adjustable switching means including a pair of contacts and a pivoted switch blade therebetween, means for turning said switching means in either direction, thermostatic means, an arm fixed to and adapted to be rotated by said thermostatic means, an actuating finger, a spring between said finger and arm for normally holding said finger in predetermined relation to said thermostatic means, said finger being positioned to engage said switch blade and move the same, said finger also being adapted to be moved against the tension of said spring by said switch blade when said switching means is moved in a given direction.

13. A thermostatic control for electric circuits, comprising a rotatably adjustable contact and a switch blade adapted to be engaged therewith and disengaged therefrom, thermostatically actuated means, and a finger yieldingly connected with said means, said finger being positioned to engage and control the position of said blade by the action of the thermostatic means.

ALBERT E. WHITTIER.